United States Patent [19]

Park

[11] Patent Number: 4,489,607
[45] Date of Patent: Dec. 25, 1984

[54] DYNAMIC VEHICLE TIRE AND WHEEL BALANCING SYSTEM

[76] Inventor: Hyo-Sup Park, 1078 Thorndale Ct., San Jose, Calif. 95121

[21] Appl. No.: 497,043

[22] Filed: May 23, 1983

[51] Int. Cl.$^3$ .................. G01M 1/08; G01M 1/18
[52] U.S. Cl. .................................. 73/462; 73/476
[58] Field of Search .............. 73/462, 66, 459, 460, 73/471, 475, 476

[56] References Cited

U.S. PATENT DOCUMENTS

| | | | |
|---|---|---|---|
| 2,322,939 | 6/1943 | Inman | 73/459 X |
| 2,758,487 | 8/1956 | Erickson | 73/66 X |
| 3,076,342 | 2/1963 | Hilgers | 73/462 |
| 4,423,632 | 1/1984 | Madden et al. | 73/462 |

Primary Examiner—James J. Gill
Attorney, Agent, or Firm—Paul L. Hickman

[57] ABSTRACT

A dynamic vehicle wheel and tire balancing system with manual rotation of the shaft to which the wheel and tire is attached. A computer within the system receives entered premeasured values of wheel dimensions and are in response to the output of a rotational speed sensor determines a proper rotational speed of the shaft at which point it automatically decouples the manually operated crank from the wheel shaft so that there can be no externally applied disturbances for the subsequent measurements of imbalance. Twin spaced transducers along the shaft determine the wheel runout attributable to imbalances in both inner and outerwheel rims and the computer provides output signals indicative of the correct balance weight and the mounting positions of the weights on the wheel rim.

8 Claims, 7 Drawing Figures

DYNAMIC VEHICLE TIRE AND WHEEL BALANCING SYSTEM

BACKGROUND OF THE INVENTION

1. Field of the Invention

This invention relates generally to mechanical tools and in particular to a dynamic vehicle tire and wheel balancing system.

2. Description of the Prior Art

Accurate balancing of any rotating body requires that it be free from the effects of external forces such as may be produced by its own rotating drive mechanism. Thus, if a tire and wheel is properly mounted on a rotatable axle or shaft of a wheel balancing machine, accurate measurements of imbalance can only be taken if the wheel and tire is not subjected to external disturbances, such as externally generated vibrations, if the axle itself is properly balanced in smooth accurate bearings, and if the rotational driving means cannot impart any vibration or other disturbances to the rotating shaft.

The disturbances generated by the rotating driving means is the most difficult to overcome and many different schemes have been attempted including the use of air-driven turbine drives, gear connected drives, belt drives, and the use of high precision electric motors connected either directly to one end of the shaft or through carefully aligned universal connectors. Motors for this application are therefore quite costly and, even though initially highly accurate, may easily be thrown out of proper alignment by careless handling to therefore impart a vibration to the drive shaft.

The balancing machine to be described eliminates the possibility of imparting externally generated disturbances to the rotating shaft and provides a highly accurate and convenient means for detecting wheel imbalance.

SUMMARY OF THE INVENTION

The wheel balancing machine described and claimed herein includes a housing having therein a centrally mounted rotatable shaft which extends from one end of the housing for mounting a tire and wheel in the conventional manner. The shaft is bearing mounted within a coaxial tubular member which is supported within the housing so that any alternating vibration caused by wheel imbalance will be transmitted through the member to piezo-electric crystal detectors mounted to the housing and responsive to the vibrations transmitted from the exterior surface of the tubular member to signal the location and amplitude of wheel imbalance to a computer located above the housing.

The end of the drive shaft opposite the wheel and tire is connected through a coaxial clutch to a hand crank which, when rotated, rotates the shaft with the attached wheel and tire. The output of an optical encoder speed sensor on the shaft is applied to the computer which determines the optimum rotational velocity for taking balance measurements and, when that optimum velocity is achieved, the computer actuates a solenoid that opens the shaft to crank clutch connection. Vibration measurements are therefore made after the shaft driving means is disconnected from the shaft and can no longer contribute errors to the imbalance measurements.

The computer within the housing accepts input signals from the shaft speed sensor, the piezo-electric vibration transducers, and also manually applied input signals representing wheel rim diameter, rim width, measured offset distance between the outer transducer and the inner rim, and selections for dynamic balance, static balance, and fine balance. The computer produces output signals to the shaft to crank clutch release solenoid, a lamp indicating clutch release, numeric displays indicating the selection is made by the manually applied inputs, and the weights and their positions, necessary to achieve proper balance of the wheel under test.

These and other objects and advantages of the present invention will no doubt become apparent upon a reading of the following descriptions and a study of the several figures of the drawing.

DETAILED DESCRIPTION OF THE PREFERRED EMBODIMENT(S)

Figure 1:
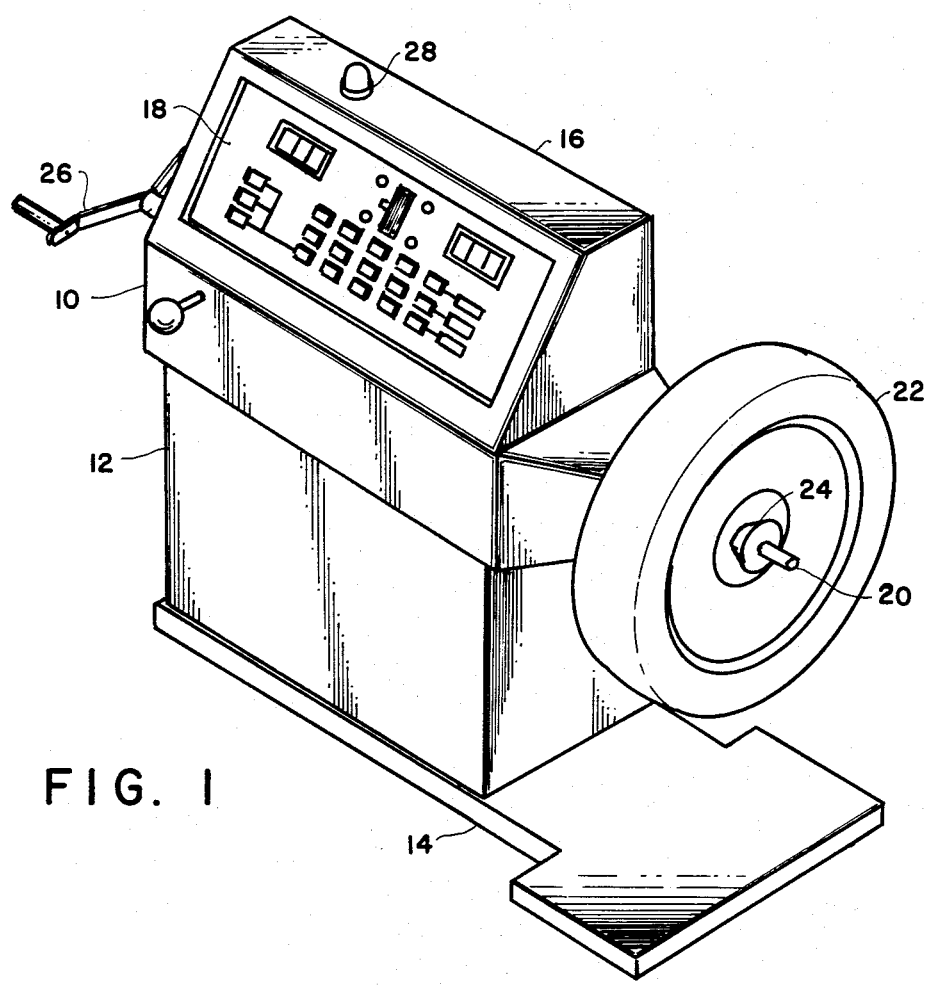
FIG. 1 is a perspective drawing illustrating the wheel balancing machine of the invention.

FIG. 1 is a perspective view of the wheel balancing machine showing a housing 10 mounted upon a pedestal box 12 on a sturdy base 14. The housing 10 supports a computer and control cabinet 16 preferably having a convenient slanted front surface containing a control panel 18 shown in greater detail in FIG. 2. The housing of the balancing machine of FIG. 1 supports a horizontal axle or shaft 20 that is bearing mounted for rotation and which extends from one end of the housing for the mounting of a vehicle tire and wheel 22 using a conventional wheel centering cone 24. As will be subsequently described, the end of the shaft 20 opposite the wheel 22 is coupled through a clutch to a coaxial rotatable shaft connected to a hand crank 26 which is used to obtain the proper rotational velocity of the wheel to take accurate balance measurements by transducers within the housing.

When the proper velocity is reached for measurements of the tire and wheel of a predetermined size, the interconnecting shaft clutch is automatically opened by the computer to disconnect the crank 26 from the shaft 20, a release lamp 28 flashes on, and the balance measurements are automatically made by the transducers under the control of the computer.

Figure 2:
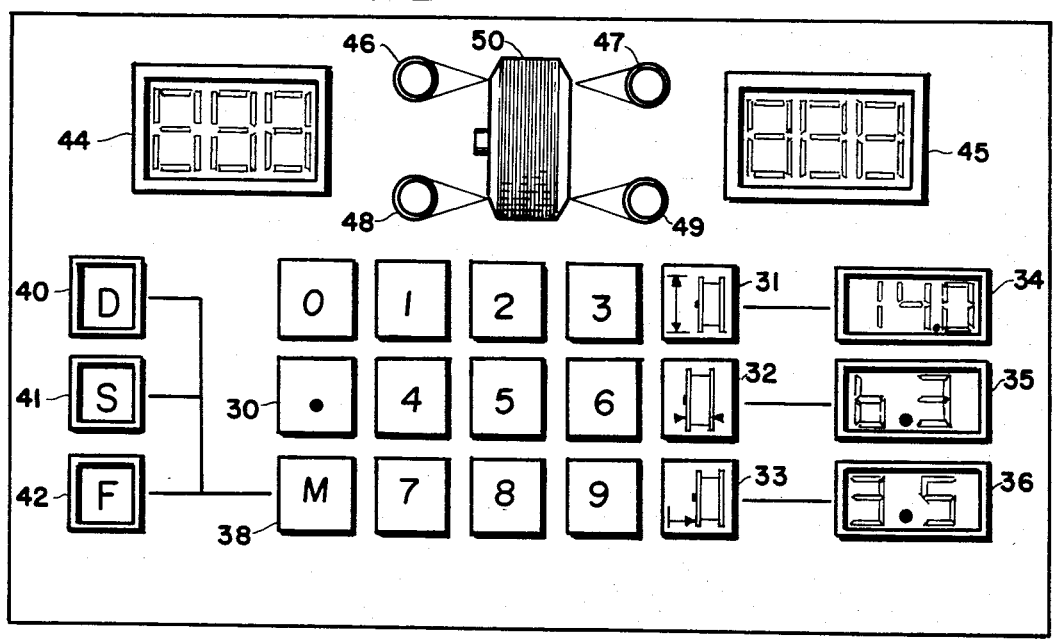
FIG. 2 is an illustration of the control panel on the balancing machine.

The control panel 18 of FIG. 2 provides a better understanding of the operation of the balancing machine.

In the static balance mode, only the outer transducer on the shaft, i.e., the transducer closer to the mounted wheel, is in operation and should produce the total balance weight correction indication that closely corresponds to that of the dynamic mode. In the static mode, there is no indication of separate inner and outer balance weights but the mounting location on the wheel is roughly indicated by the flashing of the light-emitting diode indicators 46–49 positioned to indicate inner and outer rim locations at the top and bottom of a vehicle tire 50 which is printed or otherwise illustrated in the top center position on the face of the panel 18.

In the fine position the crank 26 is disconnected from the wheel shaft 20 and the wheel 22 is slowly hand turned to the point where the light-emitting diodes 46 and 47 are illuminated. The wheel is then stopped in this position and the topmost point of the rim is now the precise point at which the weights indicated by the displays 44 and 45 must be added to achieve a proper wheel balance. After the balance weights are attached, the correction may be readily tested by returning to the dynamic mode of operation. If balancing corrections were accurate, the readout on the displays 44 and 45 will read zero.

Having first discussed the overall operation of the balancing machine, the mechanical features will now be described.

Figure 3:
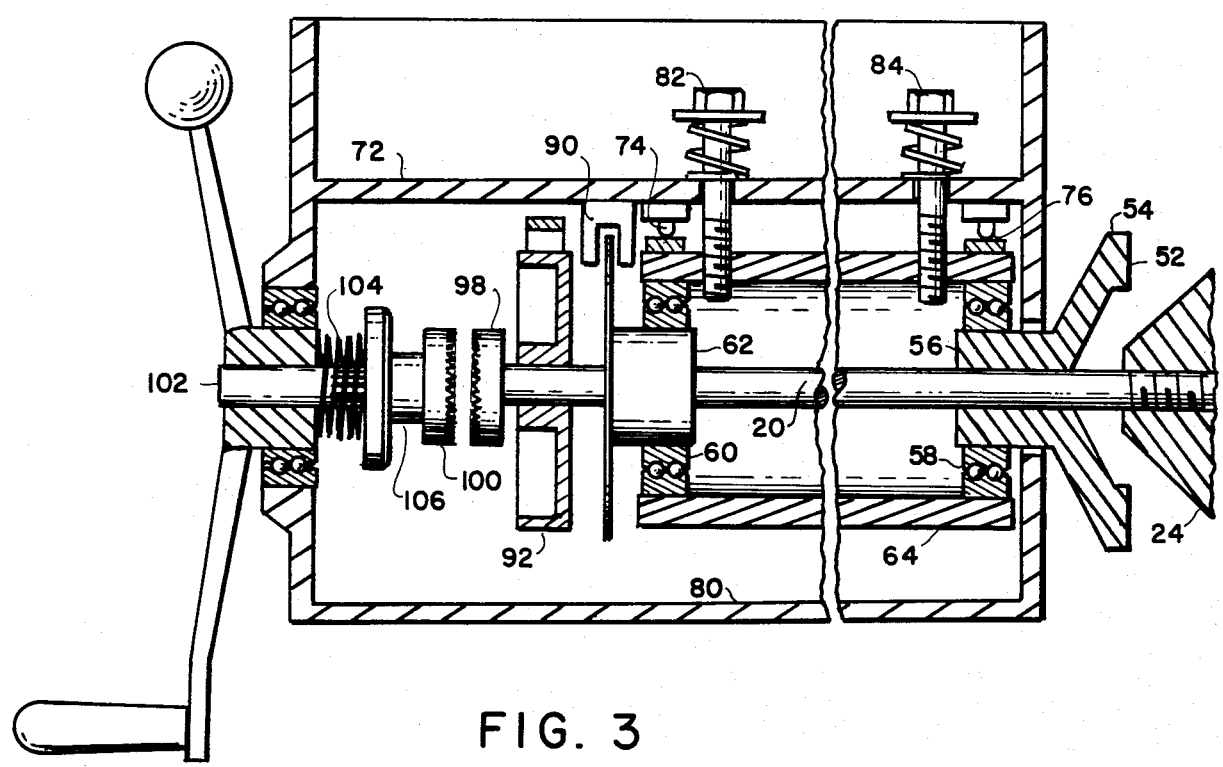
FIG. 3 is a sectional plan view of the mechanical structure of the balancing machine.

As previously mentioned, accurate balancing can only be achieved when there are no external disturbances such as those that may be transmitted to the shaft 20 by the shaft rotating means. FIG. 3 is a sectional plan view taken through the center of the housing 10 and illustrates the first end of the wheel shaft 20 extending from the end of the housing and threaded to receive a conventional wheel centering cone 24 which is fitted into the central hub aperture of a wheel to force the wheel against the edge 52 of the drum member 54 to accurately center the wheel around the shaft 20. The shaft 20 is locked into an axial hole through a hub section 56 of the drum member 54 which serves as a mounting hub for a roller or ball bearing 58. A second bearing 60 on the hub 62 spaced approximately two feet from the bearing 58 supports the shaft 20 near its second end.

Figure 6:
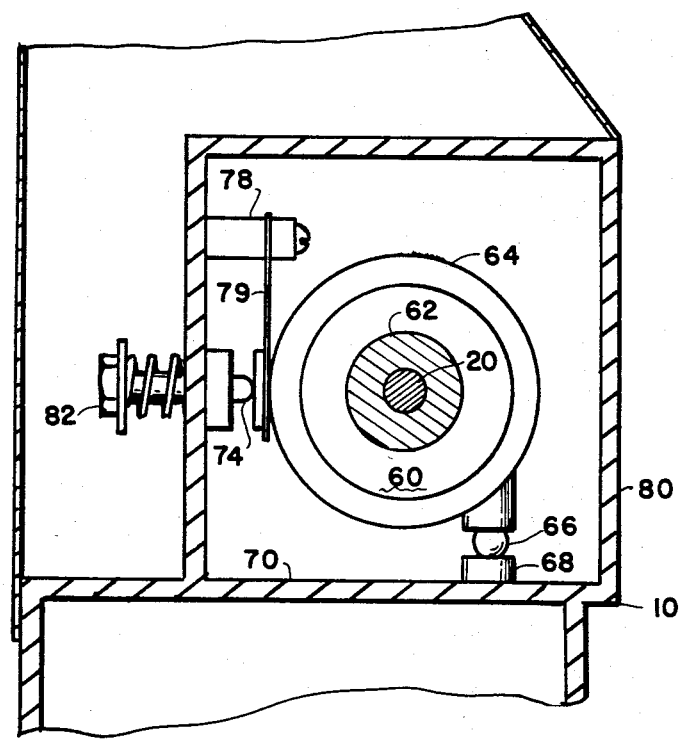
FIG. 6 is a sectional elevation view taken along the lines 6—6 of FIG. 4.

The outer race of bearings 58 and 60 are pressed into the bore of a cylindrical member 64 which is supported at only three points in the housing 10. One point comprises a ball bearing 66 in a cup mounting 68 located on the floor 70 of the housing midway between the ends of the cylindrical member and forward of a vertical plane through the axis of the member 64 so as to urge the member toward the rear wall 72, as shown in FIG. 6. The second and third supporting points are provided by a pair of pressure transducers 74 and 76 positioned between the ends of the cylindrical member 64 and the rear wall 72 and at the horizontal plane through the axis of the member. The transducers thus sense rotational irregularities transmitted from the shaft 20 through the member and caused by wheel imbalancing.

As best shown in FIG. 6 a post 78 extends horizontally from the rear wall 72 at a position above the axis of the shaft 20 and the resilient leaf spring 79 attached to the end of the post extends downward and contacts the exterior surface of the cylindrical member 64 near the ends of the member and on its horizontal plane. Immediately behind the resilient springs are transducers 74 and 76, such as piezo-electric crystal units, which sense the amplitude of any horizontal movements of the cylindrical member 64 that is caused by wheel imbalances and the resulting oscillatory movement of the shaft 20. The transducer 74 is used to measure the degree of imbalance at the inner rim of the wheel being tested, whereas the transducer 76 senses the imbalance of the outer rim.

As shown in the plan view of FIG. 3, adjustable threaded bolts 82 and 84 loosely extend through holes in the rear wall 72 of the housing 10 and are threaded into the member 64 at its horizontal plane. The bolts are biased by springs to urge the member 64 toward the rear wall and against the transducers 74 and 76 so that adjustment of the bolts provided accurate sensitivity adjustment controls for the transducers.

The hub 62, exterior of the cylindrical member 64, supports a relatively large diameter thin disc 88 which contains a large number of equally spaced apertures or radial slits near its periphery. An optical diode sensor 90 mounted on the interior surface of the wall 72 passes a light beam against the peripheral slits in the disc 88 and on the opposite surface detects the chopped beam to provide an alternating signal, the frequency of which is an accurate indication of the rotational velocity of the disc and hence the shaft 20.

Figure 4:
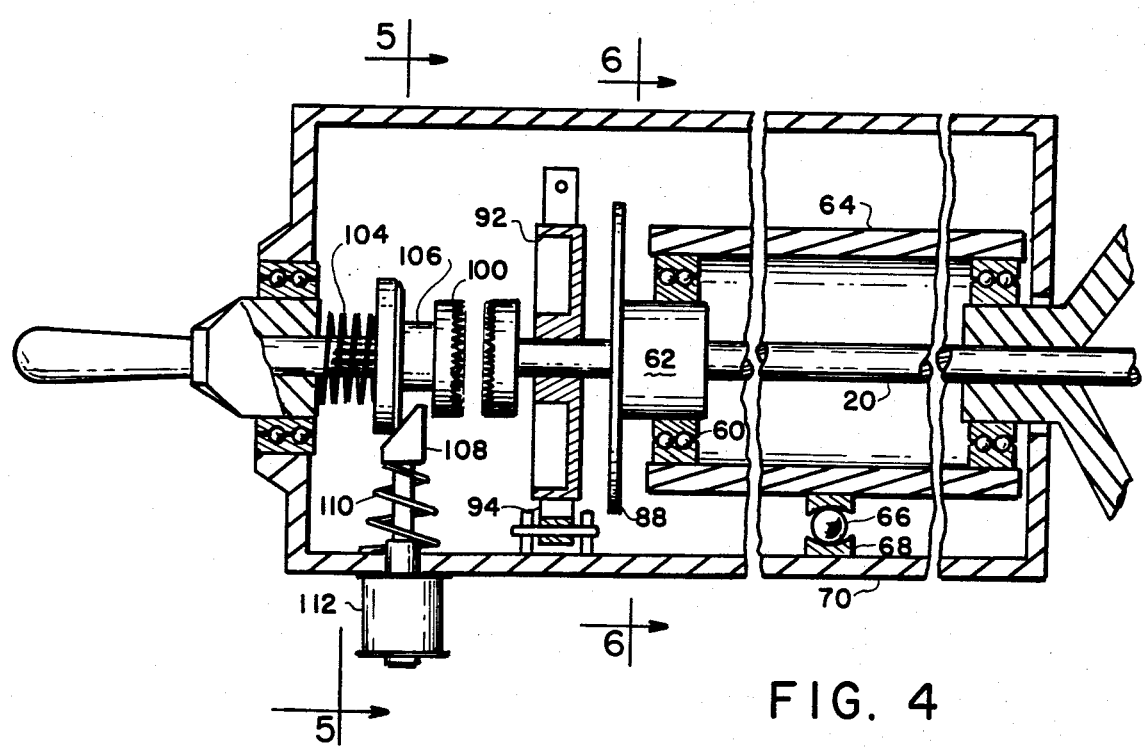
FIG. 4 is a sectional elevation view of the mechanical structure of the balancing machine.
Figure 5:
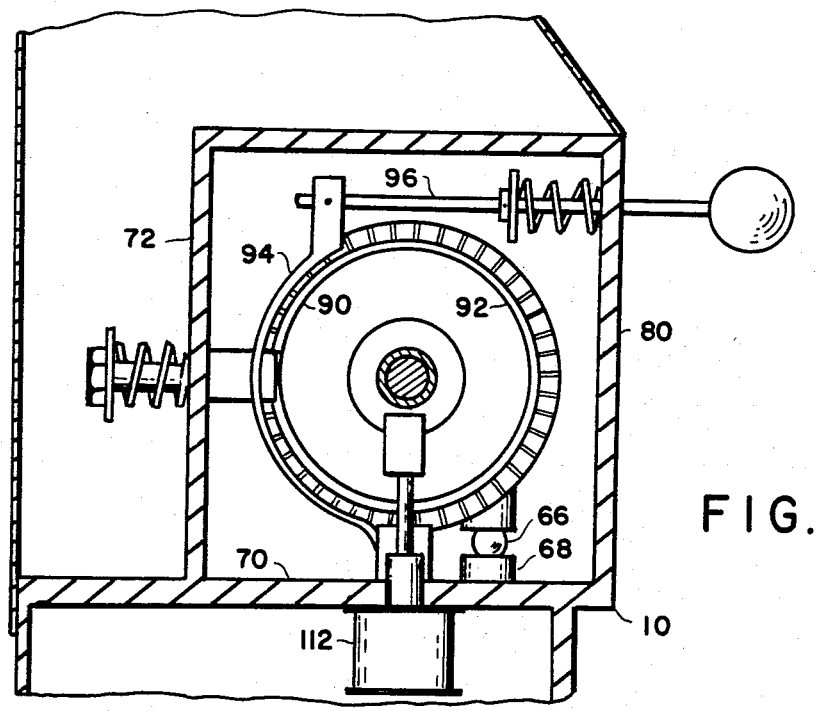
FIG. 5 is a sectional elevation view taken along the lines 5—5 of FIG. 4.

As shown in FIGS. 3, 4, and 5, a brake drum 92 is also connected to the shaft 20 and as shown in FIG. 5, is operated to slow and stop the rotation of the shaft by brake shoe 94, the bottom end of which is pivotally connected to the floor 70 of the housing 10. The upper end of the shoe is pivotally connected to a manually operable control rod 96 which extends through the front wall 80 of the housing to a convenient knob or handle. The rod 96 is preferably spring-biased to assure that the brake shoe 94 remains clear of the drum 92 during balance measurements and cannot contribute to balance errors.

The second end of the shaft 20 within the housing 10 supports a clutch member 98 which is circular and concentric with the shaft 20 so that it cannot impart any imbalance to the shaft. The exposed face of the clutch member opposite the second end of the shaft 20 is provided with a plurality of radial gear teeth which are adapted to mate with corresponding teeth on the face of a second clutch member 100. Clutch member 100 has a splined bore so that it may be slidable axially on the crank shaft 102 which is connected directly to the crank 26 as illustrated in FIGS. 3 and 4. An expansion spring 104 on the shaft 102 between the hub of crank 26 and clutch member 100 acts to force member 100 into engagement with clutch member 98. Member 100 is formed with an annular grove 106 into which is fitted a latch 108 mounted on the end of a shaft that is biased by spring 110 to urge the latch into the groove 106 to thereby disengage the clutch members 98 and 100. The latch shaft is coupled to a solenoid 112 which, when energized, withdraws the latch 108 from the groove 106 so that the clutch member 100, urged inward by spring 104, will engage clutch member 98.

Figure 7:
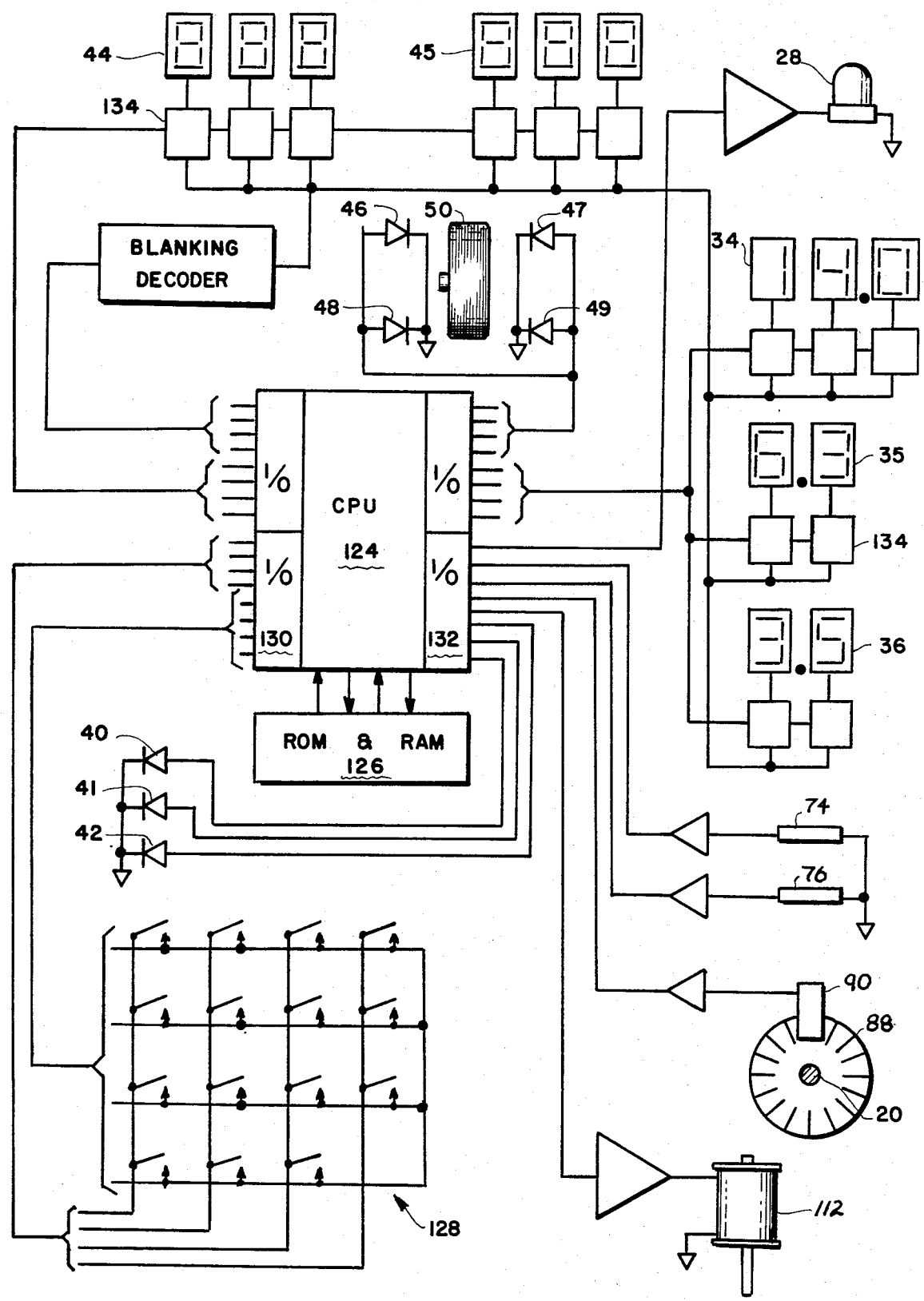
FIG. 7 is a diagram of the controls and computing section of the balancing machine.

Turning now to the block diagram of FIG. 7, a central processing unit coupled through suitable control and data busses to a read-only memory and a random access memory 126 is preferably provided with four input-output ports, each with eight input or output terminals. As previously mentioned, the computer receives input signals from the keyboard which is collectively indicated by the numeral 128 and includes all of the manually operated keys described in connection with FIG. 2. The keys are arranged in a four by four matrix and all eight lines from the keyboard 128 are introduced into the computer through the input-output unit 130. The rotational velocity of the shaft 20 is measured by the disc 88 and optical sensor 90 and the signal therefrom is amplified and applied to one input of the input-output port 132. Similarly, signals generated by the transducers 74 and 76 are amplified and also applied to the input-output port 132. With these input signals, the computer provides the following outputs. Light-emitting diodes 40, 41 and 42 indicate the selection sequentially made by the mode switch 38 of FIG. 2. The seven-segment LED displays 34, 35 and 36, respectively under the control of their associated decoder driver 134, indicate the predetermined dimensions selected by depressing the keys 31, 32 and 33 of FIG. 2. The computer uses the data relating to rim diameter, rim width, and offset, as indicated by the displays 34, 35 and 36, and the wheel velocity as determined by the disc 88 and transducer 90 and computes the optimum speed at which imbalance measurements should be taken and, upon reaching a point slightly above that speed, actuates the solenoid 112 which will disconnect the clutch members 98 and 100 so that accurate imbalance measurements may be taken without inaccuracies being contributed by outside forces. Upon the release of the clutch members, a signal is outputted from the computer through appropriate amplifier to the signal light 28 which indicates to the operator that the shaft disconnection has been made. Also at this point, inner and outer rim imbalance measurements are sensed by the inner and outer transducers 74 and 76 and the amplitude signals therefrom are applied to the computer which thereupon displays the proper weight necessary to achieve balance on the seven-segment LED displays 44 and 45.

In the fine balancing mode as selected by the mode switch 38 of FIG. 2 and indicated by the LED 42, the solenoid 112 opens the clutch between the shafts 20 and 102 and the wheel is attached to the shaft is slowly rotated until the light-emitting diodes 46 and 47 or 48 and 49 are both lighted to indicate to the operator that the proper weights must be applied to the top or bottom position of the wheel.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A vehicle tire and wheel balancing system for indicating the amount and position of weights needed for proper wheel balance, said system comprising:
   a housing;
   a cylindrical member horizontally positioned within said housing;
   pivot means supported by said housing and supporting a point on said cylindrical member's circumference located approximately midway to the length of said cylindrical member;
   suspension means attaching said cylindrical member to said housing, said suspension means restricting the vertical movement of said cylindrical member;
   a rotatable shaft coaxially journaled within said cylindrical member for rotation therein, said shaft having a first end extending therefrom for concentrically mounting a vehicle wheel thereto;
   shaft rotating means coupled to the second end of said shaft for rotating said shaft;
   a speed sensor coupled to said shaft, said sensor generating an electric signal indicative of the rotational velocity of said shaft;
   at least one transducer coupled to said cylindrical member to sense the amplitude of horizontal oscillatory vibrations in shaft resulting from imbalances in a rotating vehicle wheel mounted on the first end of said shafts, said transducer generating electrical signals indicative of said imbalances; and
   computing means responsive to said speed sensor and said transducer for computing and indicating the balance weights necessary for eliminating said imbalances.

2. The balancing system claimed in claim 1 further including a brake drum connected to said shaft, and a manually operable brake shoe for cooperating with said drum for slowing the rotational velocity for said shaft.

3. The balancing system claimed in claim 1 wherein said cylindrical member is elongated and wherein said shaft is journalled for rotation within said member near each end of said member and wherein said ends are restricted in a horizontal direction by first and second transducers adjacent each exterior end surface of said member.

4. The balancing system claimed in claim 3 further including first and second adjustable pins adjacent said first and second transducers and threaded through a wall of said housing and engaging radial holes in said cylindrical member for preventing rotation of said member, said pins having adjustable springs exerting a bias force against the exterior walls of said cylindrical member for providing adjustment sensitivity control for said first and second transducers.

5. The wheel balancing system claimed in claim 1 wherein said shaft rotating means is a manually operated crank.

6. The balancing system claimed in claim 1 further comprising a releasable shaft clutch intercoupling said shaft with said shaft rotating means, and wherein said computing means is further operative to release said shaft clutch at a predetermined rotational velocity of said shaft.

7. The balancing system claimed in claim 1 wherein said pivot means includes a ball bearing supported by said housing and supporting said cylindrical member.

8. The balancing system claimed in claim 1 wherein said suspension means includes a pair of leaf springs coupled at their upper ends to said housing and coupled at their lower ends to said cylindrical member.

* * * * *